United States Patent [19]
Krins et al.

[11] Patent Number: 6,042,941
[45] Date of Patent: Mar. 28, 2000

[54] SULPHUROUS P-ARAMID YARN

[75] Inventors: Bastiaan Krins, Dieren; Monique Helene Marielle Meeusen-Wierts, Elst; Harm van der Werff, Ede, all of Netherlands

[73] Assignee: Akzo Nobel NV, Arnhem, Netherlands

[21] Appl. No.: 09/171,221

[22] PCT Filed: Mar. 5, 1997

[86] PCT No.: PCT/EP97/01102

§ 371 Date: Nov. 17, 1998

§ 102(e) Date: Nov. 17, 1998

[87] PCT Pub. No.: WO97/39049

PCT Pub. Date: Oct. 23, 1997

[30] Foreign Application Priority Data

Apr. 17, 1996 [NL] Netherlands ............... 1002882

[51] Int. Cl.[7] ............... D02G 3/00; D02F 6/00
[52] U.S. Cl. ............... 428/364; 428/395; 264/184
[58] Field of Search ............... 428/364, 395; 264/184, 203

[56] References Cited

U.S. PATENT DOCUMENTS

| | | |
|---|---|---|
| 3,767,756 | 10/1973 | Blades . |
| 4,075,269 | 2/1978 | Jones, Jr. et al. . |
| 4,162,346 | 7/1979 | Jones, Jr. et al. ............... 428/364 |
| 4,320,081 | 3/1982 | Lammers ............... 264/184 |
| 5,128,440 | 7/1992 | Keil et al. ............... 528/337 |

FOREIGN PATENT DOCUMENTS

| | | |
|---|---|---|
| 0 021 484 | 1/1981 | European Pat. Off. . |
| 0 422 399 | 4/1991 | European Pat. Off. . |
| 0 427 280 | 5/1991 | European Pat. Off. . |
| 0 442 399 | 8/1991 | European Pat. Off. . |
| 157327 | 8/1976 | Netherlands . |
| 1000276 | 11/1996 | Netherlands . |
| WO 95/21883 | 8/1995 | WIPO . |
| WO 96/34732 | 11/1996 | WIPO . |

*Primary Examiner*—Newton Edwards
*Attorney, Agent, or Firm*—Oliff & Berridge, PLC

[57] ABSTRACT

A fiber of a para-aromatic polyamide polymer having a surprisingly higher modulus. This fiber has a quantity of sulphur bound to the aromatic nuclei of the polymer and wherein the quantity of nucleus-bound sulphur is 0.05–0.20% by weight. A process for the manufacture of para-aromatic polyamide fiber of increased modulus.

7 Claims, 2 Drawing Sheets

Tenacity versus degree of sulphonation

SULPHUROUS P-ARAMID YARN

FIELD OF THE INVENTION

The invention pertains to a fibre of a para-aromatic polyamide polymer (p-aramid) comprising a quantity of sulphur bound to the aromatic nuclei of the polymer.

DESCRIPTION OF RELATED ART

Such fibres are known. For instance, EP 427 280 (Chiou) teaches a poly(paraphenylene terephthalamide) filament yarn having chemically bound sulphur (sulphonic acid or sulphonate) groups. The yarn contains 0.5 to 3.0% by weight of S thus bound. Also described is a process for the manufacture of such a yarn. In this process the p-aramid polymer is not spun directly from the conventional solution in concentrated sulphuric acid; rather, the substantially unsulphonated polymer is first exposed to fuming sulphuric acid in a concentration of 100.5 to 102.5% for 1 to 3 hours at 70 to 80° C.

U.S. Pat. No. 4,075,269 and U.S. Pat. No. 4,162,346 (Jones) likewise disclose sulphonating p-aramid in fuming sulphuric acid. In the process described, poly(paraphenylene terephthalamide) containing 0.5 to 10% of S in the form of sulphonic acid and/or sulphonate groups bound to the aromatic nuclei is spun into a yarn.

As background art is further mentioned EP 442 399 (Keil), which discloses copolymers made from a mixture of monomers which comprises 7.5 to 30 mole-% of an alkylsulphonyl substituted aryl monomer. The exemplified sulphur content can be calculated to be about 1 wt. %.

Already in U.S. Pat. No. 3,767,756 (Blades) mention is made of the fact that fuming sulphuric acid can be used as solvent for spinning poly(paraphenylene terephthalamide). However, a warning is given here to carry out the treatment at a low temperature and in a short period of time, to avoid a decrease of the inherent viscosity and the tensile strength of the obtained fibres.

It is known that spinning p-aramid from concentrated sulphuric acid can produce fibres with excellent mechanical properties. It is also known from the aforementioned prior art that tensile strength in particular can be improved by sulphonation. Further, it is known that a p-aramid fibre containing extra sulphur is better able to withstand a heat treatment. In this connection Chiou teaches good strength retention after heat ageing, while Jones teaches that a significant increase in the tensile strength is found especially after a heat treatment.

In this familiar field of chemically (nucleus) bound sulphur-containing p-aramid fibres a novel, surprisingly improved fibre according to the invention has now been found. The invention in this connection consists of a p-aramid fibre of the aforementioned known type, with the quantity of nucleus-bound sulphur being 0.05 to 0.20% by weight, calculated on dry polymer. The fibre according to the present invention has an unexpectedly higher modulus. In addition, the fibre according to the invention has a substantially higher tensile strength, even without a heat treatment.

Preferably, the para-aramid is made up wholly or for the most part of poly(para-phenylene terephthalamide), hereinafter referred to as PPTA, and the quantity of nucleus-bound sulphur is 0.09 to 0.20% by weight. Further preference is given to a sulphur percentage of 0.09 to 0.15% by weight.

The PPTA can be made in a known manner by reacting stoichiometric quantities of para-phenylene diamine (PPD) and terephthalic acid dichloride (TDC) in an appropriate solvent (notably $CaCl_2$-containing N-methyl pyrrolidone). Suitable processes have been described in NL 157327 and WO 95121883.

To make fibres having the desired properties, use is made of an anisotropic solution of the PPTA, which preferably has a relative viscosity of at least 3.5, most preferably of more than 4.3. In this process at least 14% by weight, preferably about 17.0–20.5% by weight, is dissolved in an appropriate solvent such as concentrated sulphuric acid. Such anisotropic solutions are fully known for p-aramid in general and PPTA in particular. They can be prepared in a known manner, e.g., with the aid of a freezing process as described in NL 7904495. The spinning solution can be spun using a conventional dry jet-wet spinning process. Such processes are known from, int. al., U.S. Pat. No. 3,767,756 and U.S. Pat. No. 4,320,081.

The aforementioned background literature, NL 157327, WO 95/21883, NL 7904495, U.S. Pat. No. 3,767,756, and U.S. Pat. No. 4,320,081 is to be considered incorporated herein by reference.

To obtain the desired quantity of nucleus-bound sulphur (usually in the form of sulphone or sulphonate groups), the PPTA, or other p-aramid, after or instead of being incorporated into the usual concentrated sulphuric acid (generally at least 97%) is exposed for some time to very strong sulphuric acid in a concentration of 99.8 to 100.2%. Sulphuric acid of the desired concentration can be obtained, e.g., by adding sulphuric acid having a concentration of 99.8% or higher to the sulphuric solution. For completeness' sake, it should be noted that sulphuric acid having a concentration of more than 100% is known as oleum (fuming sulphuric acid, i.e., sulphuric acid containing free $SO_3$). Preferably, sulphuric acid in a concentration of at most 104.5% is employed (20% oleum; although a higher percentage of oleum can be used in theory, it will be more difficult then to keep the sulphur content within the limits set by the invention). The treatment with strong sulphuric acid, which is preferably carried out at a temperature in the range of 70 to 90° C., generally lasts from 0.5 to 5 hours. In the case of more than 20% oleum it may be necessary to opt for a shorter residence time and/or a lower temperature. The skilled person will know as a matter of routine how the oleum had best be added to the dissolving and spinning process employed. When a freezing process is used to make the spinning solution, as described in NL 7904495, the resulting sandy PPTA-solution is melted in an extruder prior to being spun. In this process the PPTA is preferably sulphonated by injecting the oleum into the extruder. According to the present invention, preferably an improved version of the freezing process is employed in which the PPTA mixed with concentrated sulphuric acid in the freezing process is melted and further mixed in a kneader-mixer. In this process the polymer solution passes successively through at least a melting zone and a pressure build-up zone, and at least in the melting zone is kneaded as well as mixed. In such a process the addition of oleum preferably takes the form of injection into the melting zone. The improved process referred to here is described in non-prepublished patent application NL 1000276, which should also be considered incorporated herein by reference.

It should be noted that in the prior art (Chiou, Jones) also there is question of treatment with sulphuric acid of a high concentration. Chiou teaches sulphonation of the polymer by dissolving it in 100.5 to 102.5% sulphuric acid and exposing it to this acid concentration for 1 to 3 hours at a temperature of 70 to 80° C. In Jones there is question of dissolving PPTA in concentrated (98 to 100%) sulphuric acid over a period of 14 to 50 hours at 75 to 95° C.

SUMMARY OF THE INVENTION

Unlike in this prior art, in the treatment according to the present invention, where the polymer is first dissolved in a conventional manner in concentrated sulphuric acid followed by the addition of oleum, an 0.05 to 0.20 quantity of nucleus-bound sulphur is obtained. In view of the surprising effect of this sulphur content on the modulus of the PPTA fibres, the invention also pertains to a process for the manufacture of para-aromatic polyamide fibres of increased modulus. The process comprises spinning a sulphuric acid spinning solution of the para-aromatic polyamide in a conventional manner by means of a dry jet-wet spinning process, and comprises at least one modulus-increasing treatment. One known modulus-increasing treatment is to subject the fibre after spinning to an additional hot drawing treatment. However, what is desired is the possibility of increasing the modulus also without a heat treatment. In addition, it is desired to further increase the modulus obtainable by the heat treatment. The process according to the present invention solves this problem by means of a modulus-increasing treatment consisting of the above-indicated exposure of PPTA to fuming sulphuric acid prior to its being spun. When the fibre after being spun is subjected to the usual hot after-treatment, the modulus is increased further. When a hot after-treatment is envisaged, the sulphur percentage preferably is 0.09 to 0.20, more preferably 0.12 to 0.15. When no such hot after-treatment is envisaged, the selected sulphur percentage preferably is 0.09 to 0.15.

The fibres according to the present invention can then be made by spinning the above-described spinning solution treated with highly concentrated sulphuric acid in a conventional manner. Suitable spinning processes are known to the skilled person and require no further elucidation here. One pre-eminently suitable process is a dry jet-wet spinning process such as described in the aforementioned U.S. Pat. No. 4,320,081.

In spinning processes such as indicated above usually endless filaments are made which can be combined in a known manner into a filament yarn, or from which staple fibres or other types of short fibres can be made (e.g., by cutting up the filament yarn), which fibres can be spun in a known manner to form a spun yarn. This is why within the framework of the present invention the term "fibre" stands for every conceivable type of fibre irrespective of length, including staple fibres and endless filaments.

The fibres according to the invention can be employed in any known manner, but are preferably used in filament yarn.

BRIEF DESCRIPTION OF THE DRAWINGS

The invention will be further illustrated below with reference to the following, unlimitative example and the accompanying graphs (FIG. 1 and FIG. 2).

DESCRIPTION OF THE PREFERRED EMBODIMENTS

EXAMPLE

Use was made of a LIST DTB-60 kneader-mixer with four compartments and a shaft with mixing and kneading elements. In the fourth compartment this shaft was equipped with a discharge screw element.

The wall of the second compartment (the melting zone) had a temperature of 88° C., the wall of the third compartment (the degassing zone), as well as that of the fourth compartment, had a temperature of 85° C. The shaft with mixing and kneading elements was kept at a temperature of 90° C. and rotated at a speed of 40 revolutions per minute. The kneader-mixer was kept under a vacuum of 30 mbar, and the degree of filling was set at 50%±5.

A solid polymer solution made up of 79.2% by weight of sulphuric acid and 20.8% by weight of poly(p-phenylene terephthalamide) was introduced into the second compartment of the kneader-mixer via a vacuum dome, with a throughput of 40 kg/h. The residence time of the polymer solution was about 98 minutes±10. At the end of the second compartment, i.e., at the end of the melting zone, strong sulphuric acid was injected with the aid of a Lewa three-headed metering pump (supplied by: Geveke).

In a series of experiments in which the rate of injection was kept constant, PPTA with different degrees of sulphonation was obtained by varying the concentration of the strong sulphuric acid to be injected from 99.8% to 104.5% (20% oleum).

Via a booster pump (Transmark™) and a transmission pump (Slack & Parr™) the molten spinning solution was passed to the spinning positions with a throughput of 40 kg/h and spun into filament yarns using a conventional dry jet-wet spinning process at a rate of 400 m/min.

Figure 1:
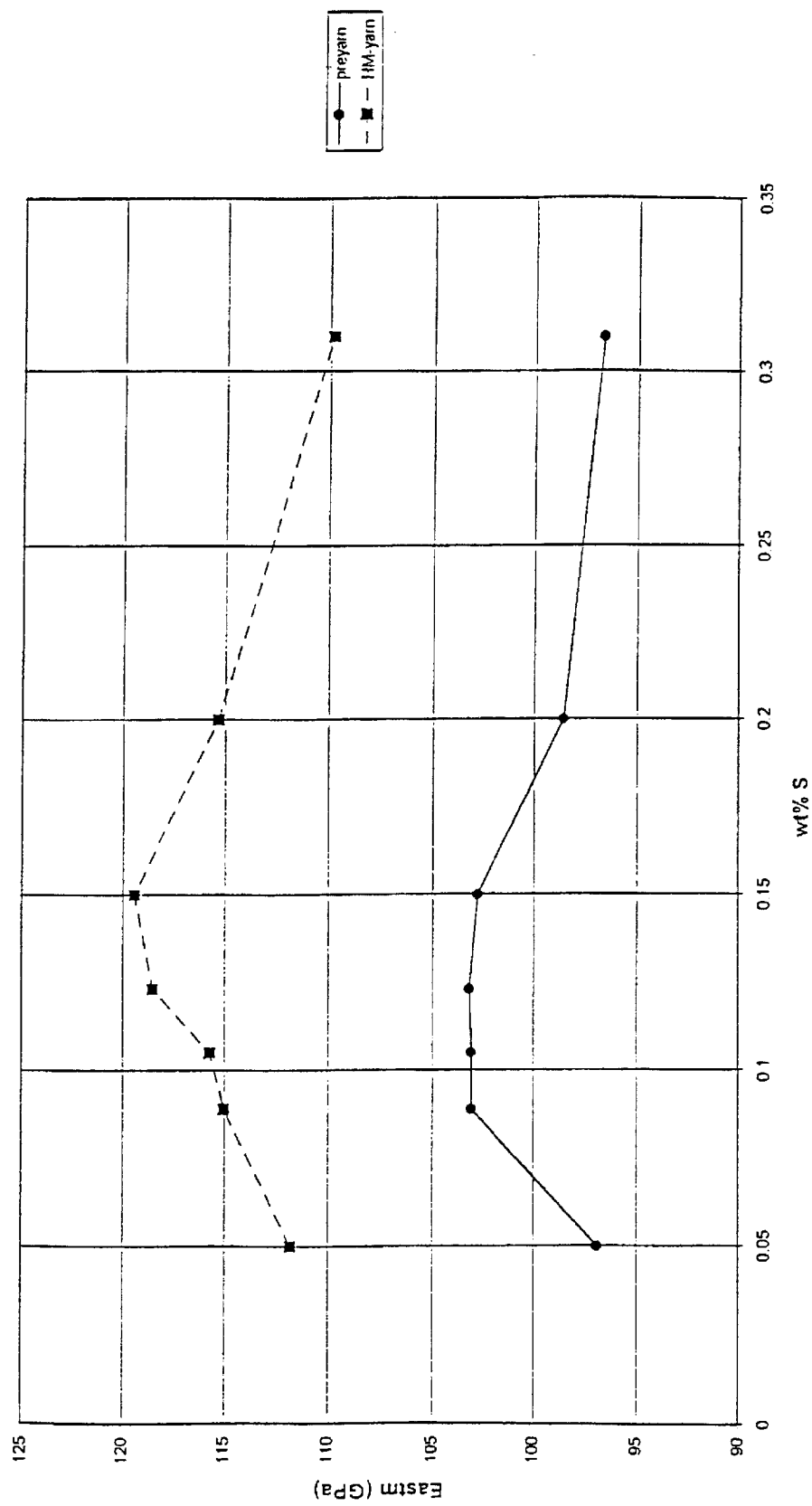
FIG. 1 is a graph of the modulus versus the degree of sulphonation

In FIG. 1 the connection is shown between the content of sulphur chemically bound to the aromatic nuclei of the poly(paraphenylene terephthalamide) and the modulus, both for sulphonated fibres as such (referred to as "pre-yam") in the form of an endless filament yarn containing 1000 filaments and for sulphonated yarn subjected to an additional hot drawing treatment at a rate of 200 m/min, a temperature of 400° C., a tension of 3000 cN (=18 cN/tex), and a residence time of about 6 seconds (referred to as "HM yarn").

Figure 2:
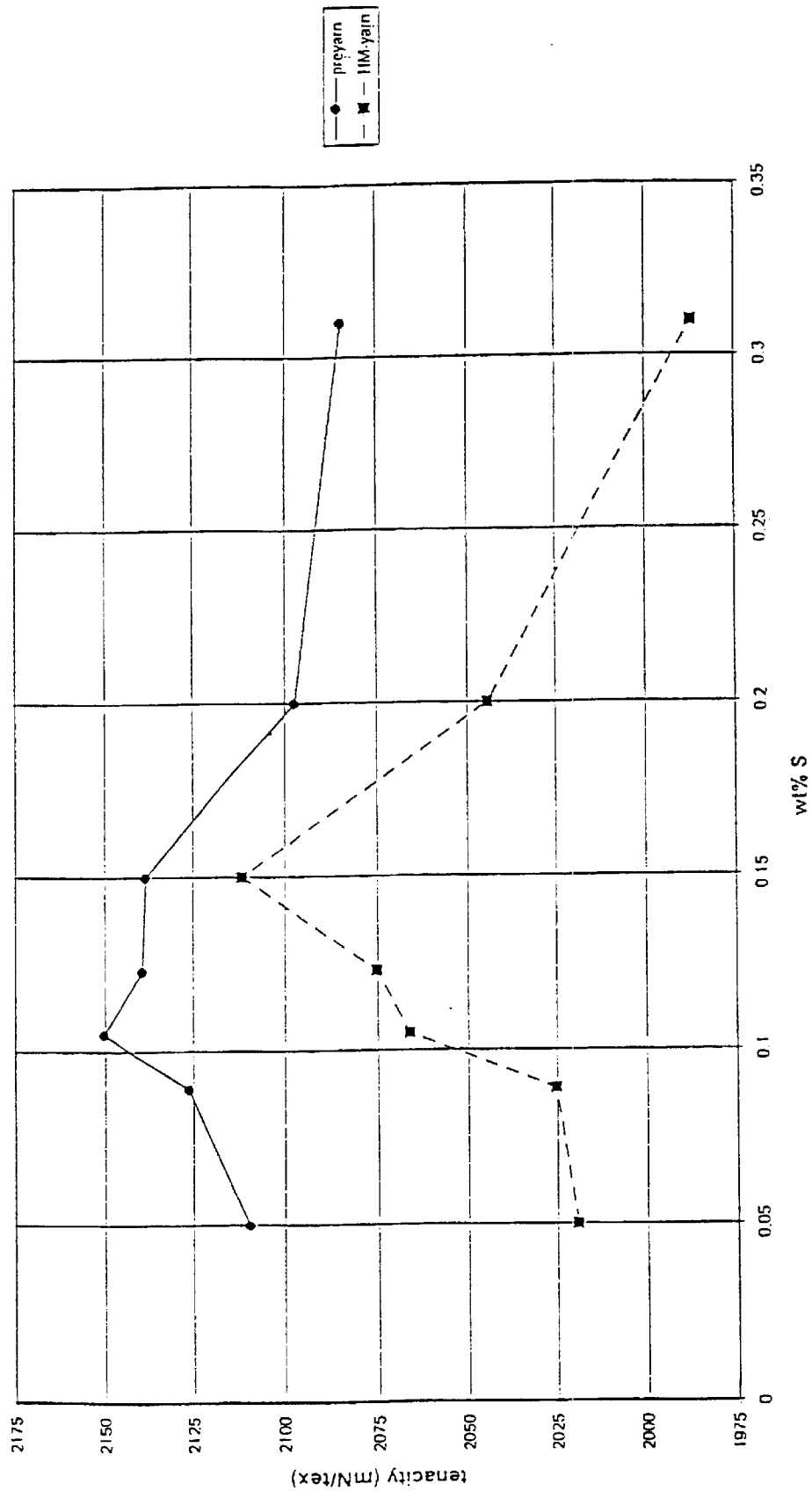
FIG. 2 is a graph of the strength versus the degree of sulphonation.

In FIG. 2 the connection is shown between the content of sulphur chemically bound to the aromatic nuclei of the poly(paraphenylene terephthalamide) and the modulus, again for both the pre-yarn and the HM-yarn as indicated above.

In FIGS. 1 and 2, respectively, the modulus and the tensile strength (both determined in accordance with ASTM D885) are shown plotted against the content of nucleus-bound sulphur. Said last content was measured by dissolving 100 m of yarn (1680 dtex), cut up into pieces, in 350 ml sulphuric acid of technical quality (95–97%) at a temperature of about 80° C. As soon as the yarn was dissolved, the resulting solution was coagulated in demineralised water, with filaments being formed. These filaments were ground up in a blender into a comparatively fine, powdery material. This material was then boiled up for 15 minutes in demineralised water, filtered off, and transferred to a soxhlet set-up, where it was after-washed for 16 hours in demineralised water. The obtained polymer was subsequently dried in a vacuum drying oven at a temperature of 80° C. Via XRF-S (also called XPS) the quantity of S present in this dry polymer as bound S was determined.

The surprising effect of the sulphur content according to the present invention is clearly shown in the figures.

What is claimed is:

1. A fibre of a para-aromatic polyamide polymer comprising a quantity of sulphur bound to an aromatic nuclei of a polymer, wherein the quantity of nucleus-bound sulphur is 0.05 to 0.20% by weight, calculated on dry polymer.

2. The fibre according to claim 1, wherein the para-aromatic polyamide is made up wholly of poly(paraphenylene terephthalamide).

3. A fibre according to claim 2, wherein the quantity of nucleus-bound sulphur is 0.09 to 0.15% by weight.

4. The fibre according to claim 1, wherein the para-aromatic polyamide is an endless filament.

5. A filament yarn comprising a plurality of fibres according to claim 4.

6. A process for making para-aromatic polyamide fibres of increased modulus comprising spinning a sulphuric spinning solution of a para-aromatic polyamide by means of an air-gap spinning process and at least one modulus-increasing treatment, wherein the modulus-increasing treatment comprises contacting the para-aromatic polyamide with sulphuric acid in a concentrations of 99.8–100.7% for 0.5–5 hours at 70–90° C. prior to being spun to obtain a para-aromatic polyamide fiber wherein the quantity of nucleus-bound sulfur is 0.05 to 0.20% by weight calculated on dry polymer.

7. The process according to claim 6, wherein the modulus-increasing treatment is carried out by adding sulphuric acid in a concentration of 99.8 to 104.5% to a concentrated sulphuric acid solution for the para-aromatic polyamide.

* * * * *